(12) United States Patent
Cheng et al.

(10) Patent No.: US 8,626,744 B2
(45) Date of Patent: Jan. 7, 2014

(54) EXECUTING CASE EXPRESSIONS CONTAINING SUBQUERIES

(75) Inventors: Qi Cheng, North York (CA); John F. Hornibrook, Markham (CA); Jose A. Saborit, Markham (CA); David C. Sharpe, St. Catharines (CA); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 13/358,779

(22) Filed: Jan. 26, 2012

(65) Prior Publication Data

US 2013/0198164 A1 Aug. 1, 2013

(51) Int. Cl.
*G06F 7/00* (2006.01)
*G06F 17/30* (2006.01)

(52) U.S. Cl.
USPC .......................................................... 707/714

(58) Field of Classification Search
USPC .......................................... 707/714, 999.002
See application file for complete search history.

(56) References Cited

U.S. PATENT DOCUMENTS

| | | | |
|---|---|---|---|
| 5,987,455 A | 11/1999 | Cochrane et al. | |
| 6,341,281 B1 | 1/2002 | Macnicol et al. | |
| 6,411,951 B1 * | 6/2002 | Galindo-Legaria et al. | 1/1 |
| 6,882,993 B1 * | 4/2005 | Lawande et al. | 707/714 |
| 6,996,557 B1 | 2/2006 | Leung et al. | |
| 2004/0153448 A1 * | 8/2004 | Cheng et al. | 707/4 |
| 2004/0220896 A1 | 11/2004 | Finlay et al. | |
| 2006/0101001 A1 * | 5/2006 | Lindsay et al. | 707/3 |
| 2006/0218123 A1 | 9/2006 | Chowdhuri et al. | |

OTHER PUBLICATIONS

Burns, Doug. "Improving SQL Efficiency Using CASE." <http://oracledoug.com/case.pdf>. Downloaded Aug. 17, 2010.
Gryz, Jarek, et al.: "SQL Queries with CASE Expressions." Proceedings 17th International Symposium, ISMIS, 2008. Toronto, Canada, May 2008. pp. 351-360.

* cited by examiner

*Primary Examiner* — Aleksandr Kerzhner
(74) *Attorney, Agent, or Firm* — Mollborn Patents, Inc.; Fredrik Mollborn

(57) ABSTRACT

Methods and apparatus, including computer program products, implementing and using techniques for executing a query in a computer to retrieve data from a relational database stored on a data storage device. A query is received that contains a CASE expression having one or more subqueries. A query execution plan is generated. The query execution plan uses a parameterized union all operator to keep the semantics of the CASE expression, and a nested loop join operator to drive data across the section of the query execution plan that executes the CASE expression without performing any join operations. The generated query execution plan is executed in the computer to retrieve data from the relational database.

9 Claims, 3 Drawing Sheets

EXECUTING CASE EXPRESSIONS CONTAINING SUBQUERIES

BACKGROUND

The present invention relates to database management systems, and more specifically, to executing expressions within database query languages. Databases come in many flavors. One popular form is a relational database management system (RDBMS), such as DB2™ system, which is manufactured by International Business Machines Corporation of Armonk, N.Y.

The RDBMS is responsible for handling all requests for access to the database where the data itself is actually stored, thereby shielding the users from the details of any specific hardware implementation. Using relational techniques, the RDBMS stores, manipulates and retrieves data in the form of table-like relations typically defined by a set of columns or attributes of data types and a set of rows (i.e. records or tuples) of data. The columns may further comprise restrictions on their data content (i.e. valid domains) and may be designated as a primary key or unique identifier for the relation or a foreign key for one or more other relations.

One very common language for dealing with RDBMSs is the Structured Query Language (SQL). SQL includes both data definition operations and data manipulation operations. To maintain data independence a query (i.e. a set of SQL commands) instructs the RDBMS what to do but not how to do it. Thus, the RDBMS includes a query processor for generating various query plans of execution and choosing the least expensive plan with respect to execution costs. Due to the high-level nature of relational expressions and a variety of implementation techniques, automatic query optimization is possible and often necessary to ensure more efficient query processing.

Often, a database application may require the creation of a "view" for the data in given relations or tables. A view provides an alternative way of looking at the data in one or more base tables. It may, for example, contain only selected columns from the table. The creation of the view or selections of data from the view may involve the processing of multiple "CASE" expressions.

In SQL, CASE expressions (CEXP), similar to any other programming language, are an intelligible way to express complex conditional clauses, which allows a selection to be made of one sequence of statements out of many possible sequences. A CEXP can be seen as a list of n logical expressions, $1\_0, \ldots, 1\_(n-1)$ and another list of n+1 actions, $a\_0, \ldots, a\_n$. An action represents a sequence of statements to be executed, and a logical expression represents a condition that can evaluate to be either true or false. Following this terminology, the semantics of a CEXP can be described as follows: the logical expressions $1\_i$ must be evaluated in increasing order from $i=0$ to $i=n-1$ until one logical expression satisfies, or all of the logical expressions fail, such that: if $i:0i<n:j:0j<i: (false(1\_j) true(1\_i))$ then $a\_i$ is executed; if $i:0i<n: false(1\_i)$ then $a\_n$ is executed. It should be noted that only one action can be executed and that all the other actions being omitted.

The syntax of a CEXP in a SQL statement can be expressed as follows:

```
SELECT
    CASE
        WHEN I_0 THEN a_0
        WHEN I_1 THEN a_1
        ....
        WHEN I_(n-1) THEN a_(n-1)
        ELSE a_n
    END
FROM ...
WHERE ....;
```

The CEXPs can appear either in the SELECT clause, in the WHERE clauses, or in any place where a scalar expression can appear.

When CEXPs contain subqueries, commercial DBMSs such as DB2 tackle CEXPs by breaking the subquery semantic block so that the subquery semantic blocks are independently executed before evaluating the CEXPs. This type of approach allows the query compiler to speed up the query processing by considering a larger search space for join ordering. However, the payoff is that the query execution plan generated by the compiler breaks the CEXP semantics, the execution of subquery semantic blocks is out of the control of logical expression, i.e., subquery semantic blocks are executed no matter of the result of the logical expression, and, as a consequence, incorrect results may be produced. Also, in some scenarios, the fact that all subquery sematic blocks are being executed might lead to performance degradations, independently of the optimizations introduced by the query compiler.

For example, say that we have the following statement:

```
SELECT
    CASE
        WHEN C1 > 0 THEN ( SELECT SUM(C2/C1) FROM T1)
        ELSE ( SELECT SUM(C2+C1) FROM T1)
    END
FROM T;
```

This CEXP has one logical expression $1\_0=C1>0$, and two actions: $a\_0=$(SELECT SUM(C2/C1) FROM T1), and $a\_1=$(SELECT SUM(C2+C1) FROM T1).

At present, a query compiler, such as the DB2 query compiler, may break the CEXP into several join operations, as illustrated in FIG. 1. For every tuple projected by the table scan on T, $a\_0$ and $a\_1$ are executed through the nested loop joins (NLJN). After that, the condition expressed by $1\_0$ is checked and the result from $a\_0$ is selected if it evaluates to true. If this is not the case, the result from $a\_1$ is used.

This CEXP execution can cause an error when $a\_0$ does not have to be executed because of its dependency on C1, that is, if C1 is 0, when $a\_0$ is executed, C2 will be divided by zero. Moreover, the execution of the query may be sub-optimal since all the actions are executed irrespective of the result from evaluating $1\_0$. Thus, there is a need for mechanisms that execute CEXPs containing subqueries, such that the semantics of the CEXP are correct.

SUMMARY

According to one embodiment of the present invention, methods and apparatus, including computer program products are provided for executing a query in a computer to retrieve data from a relational database stored on a data storage device. A query is received that contains a CASE expression having one or more subqueries. A query execution plan is generated. The query execution plan uses a parameterized union all operator to keep the semantics of the CASE expression, and a nested loop join operator to drive data across the section of the query execution plan that executes the CASE expression without performing any join operations. The generated query execution plan is executed in the computer to retrieve data from the relational database.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Overview

Figure 1:
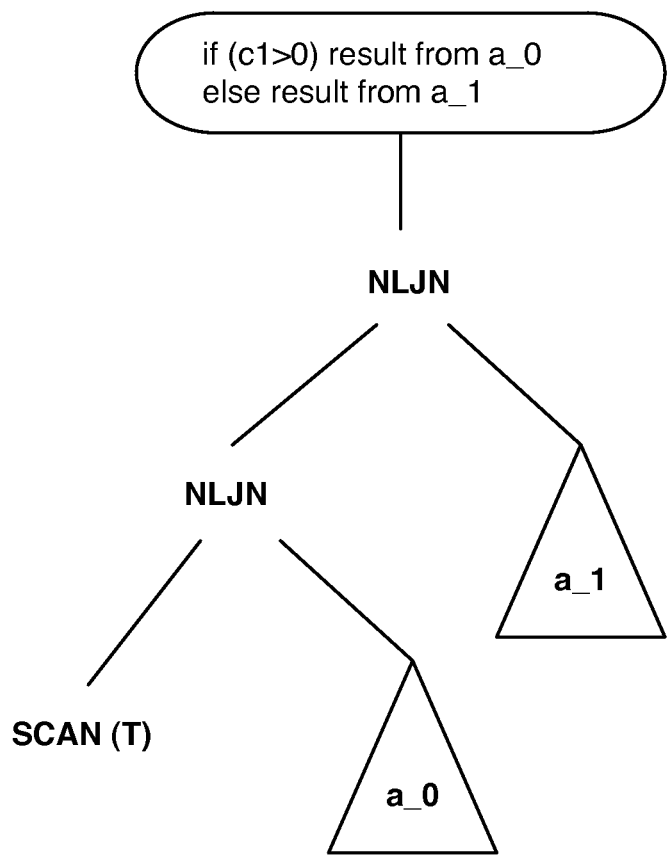
FIG. 1 shows a schematic tree diagram of join operations of a CEXP, in accordance with one embodiment.

The various embodiments of this invention address the problem of executing CEXPs within SQL statements. As was described above, CEXP in SQL statements can be optimized to speed up query execution. However, these optimizations usually break the semantic correctness of CEXPs, which may cause errors or other types of undesirable behavior. Various embodiments of the invention attempt to solve these issues by proposing new methods for executing CEXPs containing subqueries such that its semantics are intact. Besides keeping the semantic correctness of a CEXP, the methods in accordance with the various embodiments described herein can also lead to performance improvements, as compared with current CEXP execution explained above, that is, scenarios in which there is correlation towards the actions to be executed by a CEXP.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The Parameterized Union All (PUA) Operator

Figure 2:
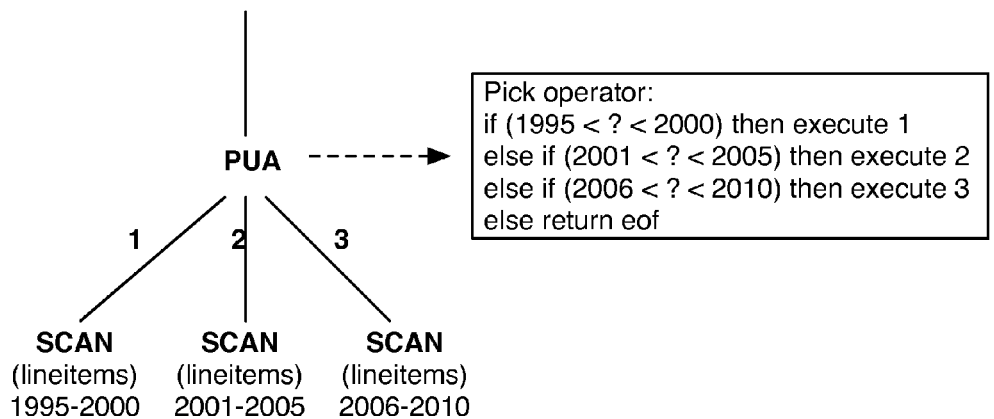
FIG. 2 shows a schematic view of a query plan using a PUA operator, in accordance with one embodiment.

In order to solve the above-mentioned problems, a Parameterized Union All (PUA) operator is used. The PUA operator has two or more inputs, referred to as "branches", in contrast to the conventional SQL "Union All" operator, which only executes one of its branches. The PUA operator executes an internal operator, referred to herein as a "pick operator", which selects the branch to be executed based on a conditional expression. A common use of the PUA operator is on partitioned tables, in which rows are grouped in a specified range of a single dimension in the same data partition, and in which only access to a specific group of rows is needed. As an example, consider a table "lineitems" partitioned by the year the lineitem was committed. Consider the following statement: "SELECT 1_lineitem FROM lineitems WHERE year (1_commited)=?". For this statement, the query optimizer could generate a query plan as illustrated in FIG. 2. In this example, the pick operator chooses the branch to execute based on the value of the parameter marker "?". If the value is out of the partitioning range, then the pick operator will return an "end of file".

Executing CEXPs

In one embodiment, a method for executing CEXPs that contain subqueries uses the PUA and the NLJN operators. The PUA operator is used to keep the semantics of the CEXP, and the NLJN is used to drive the data across the section of the query execution plan that executes the CEXP. It should be noted that no join operation is carried out by the NLJN, but that the operator is merely used to drive each tuple generated by the outer relation (i.e., the left child), to the inner relation (i.e., the right child, the PUA).

In the following discussion, the following additional definitions will be used:

Simple logical expression: a logical expression is said to be simple if its evaluation does not require the execution of a scalar subquery (i.e., a subquery that returns a single row).

Figure 4:
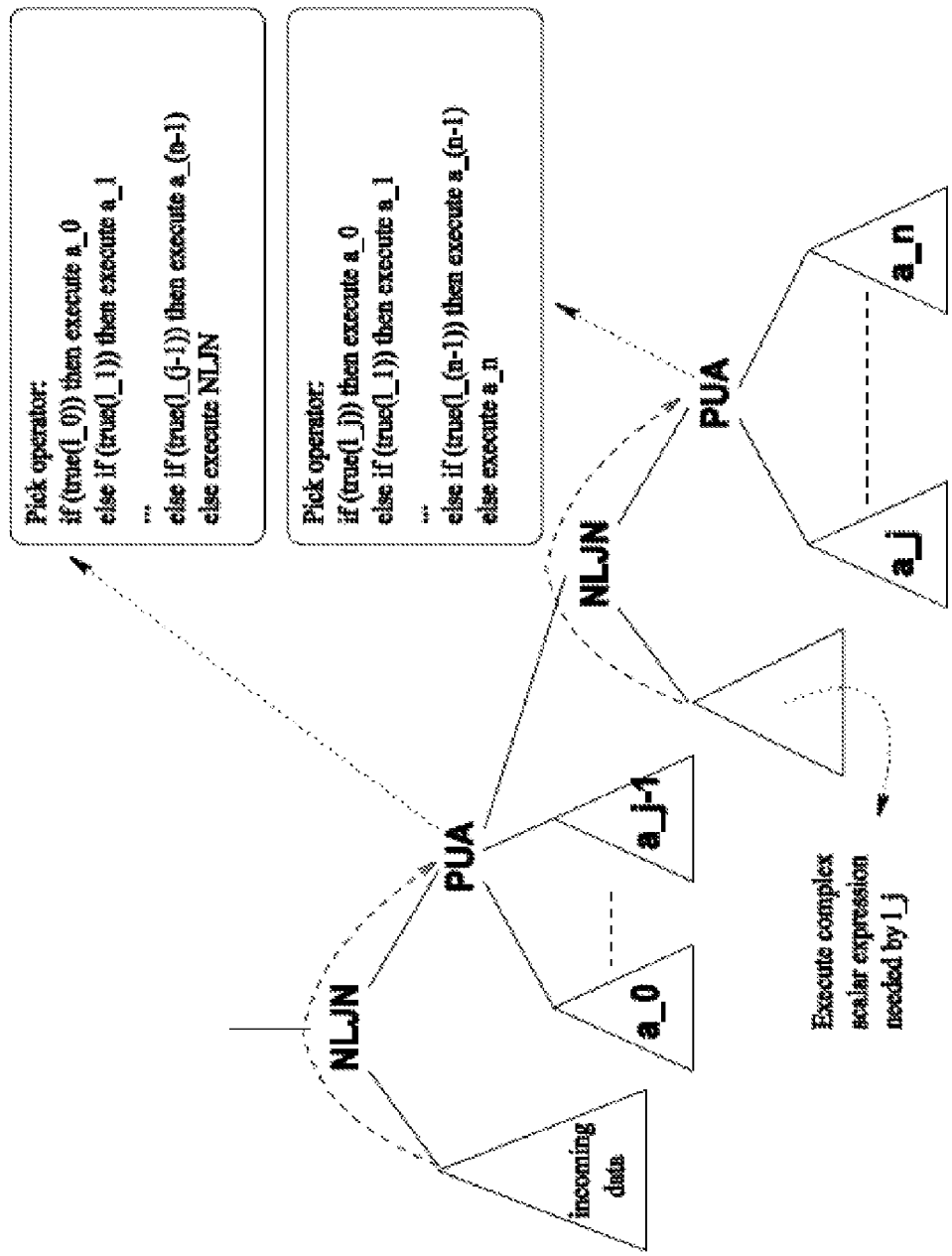
FIG. 4 shows a strategy for handling a CEXP when containing simple and complex logical expressions, in accordance with one embodiment.

Complex logical expression: a logical expression is said to be complex if its evaluation does require the execution of one or more scalar subqueries (see, for example, 1_j in FIG. 4).

In one embodiment, the pick operator in the PUA can only handle simple logical expressions. Thus, different techniques are used depending on whether the logical expressions in the CEXP are simple, or whether there is a mix of simple and complex logical expressions. Each of these situations will now be discussed in further detail.

Simple Logical Expressions

When all logical expressions 1_i in a CEXP are simple, a method in accordance with one embodiment for executing the CEXP includes using a single PUA with n+1 branches (one per each action in the CEXP) and a NLJN that drives the data towards the PUA.

Figure 3:
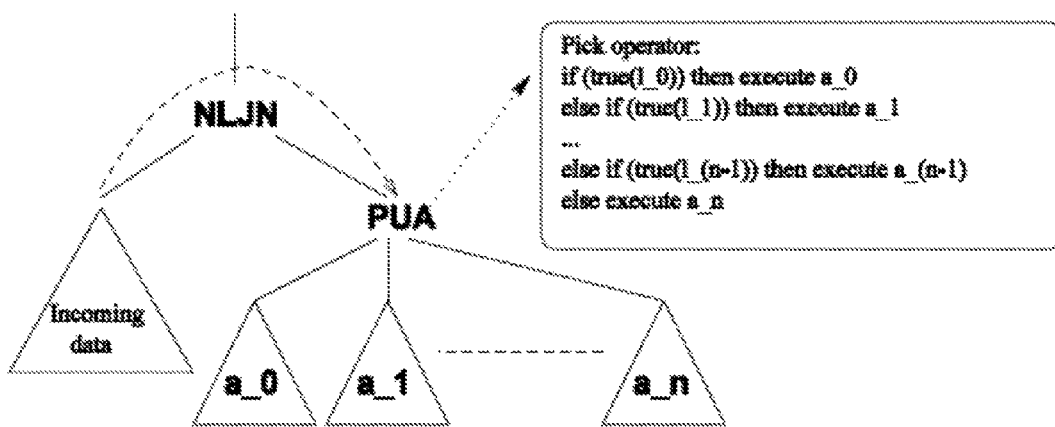
FIG. 3 shows a strategy for handling a CEXP when all logical expressions are simple, in accordance with one embodiment.

FIG. 3 shows the strategy for handling a CEXP when all logical expressions are simple, in accordance with one embodiment. As can be seen in FIG. 3, the NLJN is used to feed the PUA, which is responsible for executing the CEXP. The pick operator evaluates the logical expressions 1_i in increasing order from i=0 to i=n−1. When a logical expression evaluates to true, then the corresponding action is executed. If all 1_i evaluate to false, then a_n is executed.

Both Simple and Complex Logical Expressions

When complex logical expressions are present, the scalar subqueries, needed for their evaluation, cannot be executed by the pick operator. For example, assume that a CEXP includes a complex logical expression 1_j. The execution of the CEXP will proceed as explained above until 1_j is found by the pick operator of the PUA. When this happens, the pick operator automatically selects branch j to be executed, not to execute action a_j, but to execute the scalar subqueries through a NLJN, that will drive the results to another PUA. This PUA, with the subqueries being resolved, can evaluate 1_j. If 1_j evaluates to true, action a_j is selected, the execution of the CEXP is continued. Every complex logical expression will add one level of depth. FIG. 4 illustrates this strategy in accordance with one embodiment for executing CEXPs in these situations. For the sake of simplicity, this example only includes one complex logical expression, 1_j.

In summary, the techniques described herein in accordance with various embodiments combine the use of the PUA and NLJN relational operators to ensure the semantic correctness of CEXPs and, in terms of performance, can improve existing techniques used by existing conventional commercial database management systems, such as DB2.

The diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for executing a query in a computer to retrieve data from a relational database stored on a data storage device, the method comprising:
   receiving a query containing a CASE expression having one or more subqueries;
   generating a query execution plan, the query execution plan using a parameterized union all operator to keep the semantics of the CASE expression, and a nested loop join operator to drive data across the section of the query execution plan that executes the CASE expression,
   wherein, when all logical expressions in the CASE expression are simple expressions, a single parameterized union all operator with one branch per action in the CASE expression is used and the nested loop join operator provides data to the parameterized union all operator which executes the CASE expression; and
   executing the generated query execution plan in the computer to retrieve data from the relational database.

2. The method of claim 1, wherein the parameterized union all operator executes an internal pick operator which selects a logical branch of the CASE expression to be executed based on a conditional expression.

3. The method of claim 1, wherein when the CASE expression contains a combination of simple and complex logical expressions,
   multiple parameterized union all operators are used, at least some parameterized union all operators having one branch per action in the CASE expression and an additional branch for executing scalar subqueries through a nested loop join operator, and
   the nested loop join operator receives a subquery from a parameterized union all operator and provides the received data to another parameterized union all operator which executes the subquery of the CASE expression.

4. A computer program product for executing a query in a computer to retrieve data from a relational database stored on a data storage device, the computer program product comprising:
   a computer readable storage medium having computer readable program code embodied therewith, the computer readable program code comprising:
   computer readable program code configured to receive a query containing a CASE expression having one or more subqueries;
   computer readable program code configured to generate a query execution plan, the query execution plan using a parameterized union all operator to keep the semantics of the CASE expression, and a nested loop join operator to drive data across the section of the query execution plan that executes the CASE expression,
   wherein, when all logical expressions in the CASE expression are simple expressions, a single parameterized union all operator with one branch per action in the CASE expression is used and the nested loop join operator provides data to the parameterized union all operator which executes the CASE expression; and
   computer readable program code configured to execute the generated query execution plan in the computer to retrieve data from the relational database.

5. The computer program product of claim 4, wherein the parameterized union all operator executes an internal pick operator which selects a logical branch of the CASE expression to be executed based on a conditional expression.

6. The computer program product of claim 4, wherein when the CASE expression contains a combination of simple and complex logical expressions,
   multiple parameterized union all operators are used, at least some parameterized union all operators having one branch per action in the CASE expression and an additional branch for executing scalar subqueries through a nested loop join operator, and
   the nested loop join operator receives a subquery from a parameterized union all operator and provides the received data to another parameterized union all operator which executes the subquery of the CASE expression.

7. An apparatus for executing a query to retrieve data from a relational database stored on a data storage device, comprising:
   a computer having a memory and a data storage device coupled thereto, wherein the data storage device stores a relational database; and
   one or more computer programs, performed by the computer, for:
   receiving a query containing a CASE expression having one or more subqueries;
   generating a query execution plan, the query execution plan using a parameterized union all operator to keep the semantics of the CASE expression, and a nested loop join operator to drive data across the section of the query execution plan that executes the CASE expression,
   wherein, when all logical expressions in the CASE expression are simple expressions, a single parameterized union all operator with one branch per action in the CASE expression is used and the nested loop join operator provides data to the parameterized union all operator which executes the CASE expression; and
   executing the generated query execution plan in the computer to retrieve data from the relational database.

8. The apparatus of claim 7, wherein the parameterized union all operator executes an internal pick operator which selects a logical branch of the CASE expression to be executed based on a conditional expression.

9. The apparatus of claim 7, wherein when the CASE expression contains a combination of simple and complex logical expressions,
   multiple parameterized union all operators are used, at least some parameterized union all operators having one branch per action in the CASE expression and an additional branch for executing scalar subqueries through a nested loop join operator, and
   the nested loop join operator receives a subquery from a parameterized union all operator and provides the received data to another parameterized union all operator which executes the subquery of the CASE expression.

* * * * *